United States Patent [19]

Masson et al.

[11] Patent Number: 4,817,028

[45] Date of Patent: Mar. 28, 1989

[54] DEVICE FOR SUMMING OF SQUARES

[75] Inventors: Jacques L. R. Masson, La Celle Saint Cloud; Zdenek Picel, Velizy, both of France

[73] Assignee: U.S. Philips Corporation, New York, N.Y.

[21] Appl. No.: 935,996

[22] Filed: Nov. 26, 1986

[30] Foreign Application Priority Data

Nov. 29, 1985 [FR] France .................................. 85 17685

[51] Int. Cl.$^4$ .............................................. G06F 7/38
[52] U.S. Cl. .................................... 364/753; 364/736
[58] Field of Search ............... 364/753, 754, 736, 728, 364/728.03

[56] References Cited

U.S. PATENT DOCUMENTS

| | | | |
|---|---|---|---|
| 3,379,865 | 4/1968 | Sinniger | 364/753 |
| 4,639,857 | 1/1987 | McCanny et al. | 364/754 |
| 4,701,876 | 10/1987 | McCanny et al. | 364/728 |

OTHER PUBLICATIONS

Agrawal, "High-Speed Arithmetic Arrays" *IEEE Trans. on Computers* vol. C-28, No. 3, Mar. 1979 pp. 215-224.

*Primary Examiner*—David H. Malzahn
*Attorney, Agent, or Firm*—Thomas A. Briody; Jack E. Haken; Anne E. Barschall

[57] ABSTRACT

This device for summing squares is designed to calculate the sum of the squares of "n" numbers with "m" binary elements, where n and m are whole numbers equal to or greater than "2"; it is made up from a systolic network 14 formed of identical cells arranged in lines and columns and around which is arranged a first peripheral circuit 16 to supply signals to the upper line, a second peripheral circuit 18 to supply signals to the input column also receiving signals from a presentation circuit 20 acting as an interface between the "n" numbers and the systolic network and finally an output circuit 22 connected to the lower line. Each line of the network is allocated to the calculation of the square of each of the numbers. Calculations are carried forward from the upper to the lower line via links between the lines. The output circuit consists of an adder component supplying the result from the calculations brought forward from the last line.

9 Claims, 13 Drawing Sheets

| t | CI | XI | EFI | K0,0 | K0,1 | K0,2 | K0,3 | K0,4 | K0,5 | K0,6 |
|---|---|---|---|---|---|---|---|---|---|---|
| 0 | 1 | b0 | 0 | b0 | 0 | 0 | 0 | 0 | 0 | 0 |
| 1 | 0 | b1 | 0 | 0 | 0 | 0 | 0 | 0 | 0 | 0 |
| 2 | 0 | b2 | 0 | b0.b1 | b1 | 0 | 0 | 0 | 0 | 0 |
| 3 | 0 | b3 | 0 | b0.b2 | 0 | 0 | 0 | 0 | 0 | 0 |
| 4 | 0 | b4 | 0 | b0.b3 | b1.b2 | b2 | 0 | 0 | 0 | 0 |
| 5 | 0 | b5 | 0 | b0.b4 | b1.b3 | 0 | 0 | 0 | 0 | 0 |
| 6 | 0 | b6 | 1 | b0.b5 | b1.b4 | b2.b3 | b3 | 0 | 0 | 0 |
| 7 | 0 | 0 | 0 | $\overline{b0.b6}$ | b1.b5 | b2.b4 | 0 | 0 | 0 | 0 |
| 8 | 0 | 0 | 0 | 0 | $\overline{b1.b6}$ | b2.b5 | b3.b4 | b4 | 0 | 0 |
| 9 | 0 | 0 | 0 | 0 | 0 | $\overline{b2.b6}$ | b3.b5 | 0 | 0 | 0 |
| 10 | 0 | 0 | 0 | 0 | 0 | 0 | $\overline{b3.b6}$ | b4.b5 | b5 | 0 |
| 11 | 0 | 0 | 0 | 0 | 0 | 0 | 0 | $\overline{b4.b6}$ | 0 | 0 |
| 12 | 0 | 0 | 0 | 0 | 0 | 0 | 0 | 0 | $\overline{b5.b6}$ | b6 |

| t | CI | XI | EFI | K'0,0 | K'0,1 | K'0,2 | K'0,3 |
|---|----|----|-----|-------|-------|-------|-------|
| 0 | 1  | b0 | 0 | b0 | 0 | 0 | 0 |
| 1 |    | b1 | 0 | 0 | 0 | 0 | 0 |
| 2 |    | b2 | 0 | b0.b1 | b1 | 0 | 0 |
| 3 |    | b3 | 0 | b0.b2 | 0 | 0 | 0 |
| 4 |    | b4 | 0 | b0.b3 | b1.b2 | b2 | 0 |
| 5 |    | b5 | 0 | b0.b4 | b1.b3 | 0 | 0 |
| 6 |    | b6 | 1 | b0.b5 | b1.b4 | b2.b3 | b3 |
| 7 |    | 0  | 0 | $\overline{b0.b6}$ | b1.b5 | b2.b4 | 0 |
| 8 | 1  | b4 | 0 | b4 | $\overline{b1.b6}$ | b2.b5 | b3.b4 |
| 9 |    | b5 | 0 | 0 | 0 | $\overline{b2.b6}$ | b3.b5 |
| 10|    | b6 | 1 | b4.b5 | b5 | 0 | $\overline{b3.b6}$ |
| 11|    | 0  | 0 | $\overline{b4.b6}$ | 0 | 0 | 0 |
| 12|    | 0  | 0 | 0 | $\overline{b5.b6}$ | b6 | 0 |

FIG.13

$$\begin{aligned}
B^2 = & \, b_0 \cdot 2^0 \\
& + 0 \cdot 2^1 \\
& + (b_0 \cdot b_1 + b_1) \cdot 2^2 \\
& + (b_0 \cdot b_2) \cdot 2^3 \\
& + (b_0 \cdot b_3 + b_1 \cdot b_2 + b_2) \cdot 2^4 \\
& + (b_0 \cdot b_4 + b_1 \cdot b_3) \cdot 2^5 \\
& + (b_0 \cdot b_5 + b_1 \cdot b_4 + b_2 \cdot b_3 + b_3) \cdot 2^6 \\
& \overline{\phantom{xxxxxxxxxxxxxxxxxxxxxxxxxxxx}} \\
& + b_{m-1} \cdot 2^{2m-2}
\end{aligned}$$

FIG. 14

| | $b_{m-1}$ | ... | $b_6$ | $b_5$ | $b_4$ | $b_3$ | $b_2$ | $b_1$ | $b_0$ |
|---|---|---|---|---|---|---|---|---|---|
| X | $b_{m-1}$ | ... | $b_6$ | $b_5$ | $b_4$ | $b_3$ | $b_2$ | $b_1$ | $b_0$ |
| | | ... | $b_0 \cdot b_5$ | $b_0 \cdot b_4$ | $b_0 \cdot b_3$ | $b_0 \cdot b_2$ | $b_0 \cdot b_1$ | 0 | $b_0$ |
| + | | ... | $b_1 \cdot b_4$ | $b_1 \cdot b_3$ | $b_1 \cdot b_2$ | 0 | $b_1$ | | |
| + | | ... | $b_2 \cdot b_3$ | 0 | $b_2$ | | | | |
| + | | ... | $b_3$ | | | | | | |
| + $b_{m-1}$ | ... | | | | | | | | |
| $bb \ldots bb_{m-1}$ $_{2m-2}$ | ... | $bb_6$ | $bb_5$ | $bb_4$ | $bb_3$ | $bb_2$ | $bb_1$ | $bb_0$ | |

FIG. 15

| | | X | $(b_{m-1})$ | $b_{m-2}$ | ... | $b_3$ | $b_2$ | $b_1$ | $b_0$ |
|---|---|---|---|---|---|---|---|---|---|
| | | | $(b_{m-1})$ | $b_{m-2}$ | ... | $b_3$ | $b_2$ | $b_1$ | $b_0$ |
| | | | $b_0 \cdot (b_{m-1})$ | $b_0 \cdot b_{m-2}$ | ... | $b_0 \cdot b_2$ | $b_0 \cdot b_1$ | 0 | $b_0$ |
| | + | $b_1 \cdot (b_{m-1})$ | $b_1 \cdot b_{m-2}$ | $b_1 \cdot b_{m-3}$ | ... | 0 | $b_1$ | | |
| $+ b_{m-2} \cdot (b_{m-1})$ | 0 | ... | | | | | | | |
| + $(b_{m-1})$ | | | | | | | | | |
| + 0 | 0 | ... | 1 | 0 | 0 | ... | 0 | 0 | 0 | 0 |
| $bb_{2m-2}$ | $bb_{2m-1}$ | ... | $bb_m$ | $bb_{m-1}$ | $bb_{m-2}$ | ... | $bb_3$ | $bb_2$ | $bb_1$ | $bb_0$ |

FIG. 16

DEVICE FOR SUMMING OF SQUARES

This invention concerns a device for calculating the sum of the squares of up to "n" numbers each having up to "m" binary elements, wherein "n" and "m" are greater than or equal to "2", made up from a systolic network formed of identical cells arranged in rows and columns, said network receiving from a presentation circuit signals representing the "n" numbers and around which network are arranged a first peripheral circuit to supply signals to the upper row, a second peripheral circuit to supply signals to the input column, and finally an output circuit connected to the lower row.

To find the square of a number, it is possible to use a systolic network designed to perform the multiplication where the multiplicand and the multiplier are identical. However, the formation of the sum requires a supplementary processing operation.

There are applications requiring the calculation of a large number of squares, e.g. vector quantification, consisting in finding from among a set of reference vectors the one closest to a given vector to be quantified.

In this connection, reference may be made to the article by M. J. Sabin and R. M. Gray entitled "Product Code Vector Quantizers for Waveform and Voice Coding" published in IEEE Transactions on Acoustics, Speech and Signal Processing, Volume ASSP-32, No. 3, June 1984.

In this article a problem is encountered in that a quantity $d(x; \hat{x})$, where x represents the vector to be quantized and $\hat{x}$ represents the set of N reference vectors $\hat{x}_i$ (i=1, 2, ..., N), must be minimized. Therefore, for each vector to be quantized, a particular one of the vectors is sought which minimizes said quantity. When simplifying hypotheses are used, $d(x; \hat{x})$ may assume the value:

$$d(\hat{x}; x) = |\ ||x - \hat{x}||\ |^2 = (x1 - \hat{x}1)^2 + (x2 - \hat{x}2)^2 + \ldots (xN - \hat{x}N)^2,$$

where x1, x2, ..., xN are the components of the vector x and $\hat{x}1, \hat{x}2, \ldots, \hat{x}N$ are the components of the vector $\hat{x}$ (see reference [1] of the article, that is to say "Vector Quantization . . . " by H. Abut, published in IEEE Transactions on Acoustics, Speech and Signal Processing, Volume ASSP-30, No. 3, June 1982, notably formule (2)). This implies a large number of calculations of the squares $(xj - \hat{x}j)^2$ and a calculation of their sum.

The present invention proposes a device for summing squares of the kind set forth which enables a direct calculation of this sum without using an intermediate, supplementary processing operation.

For this purpose, a numeric device for calculating the sum of the squares of "n" numbers is characterized in that each row of the network is allocated to the calculation of the square of a particular one of the numbers, there are links between contiguous rows to carry forward the calculation results of an upper row to the next lower row and the output circuit is an adding component supplying the result from the sums brought forward from the lowest row.

Various further advantages aspects are recited in the dependent Claims. The invention can be used in other fields of application than vector quantization.

BRIEF DESCRIPTION OF THE FIGURES

The following description, given with reference to the attached drawings, being given by way of non-limitative example, will show how the invention may be realized.

FIGS. 14, 15 and 16 give three sets of expressions for explaining the algorithm of the invention.

DESCRIPTION OF A PREFERRED EMBODIMENT OF A DEVICE ACCORDING TO THE INVENTION

Figures 1, 1A:
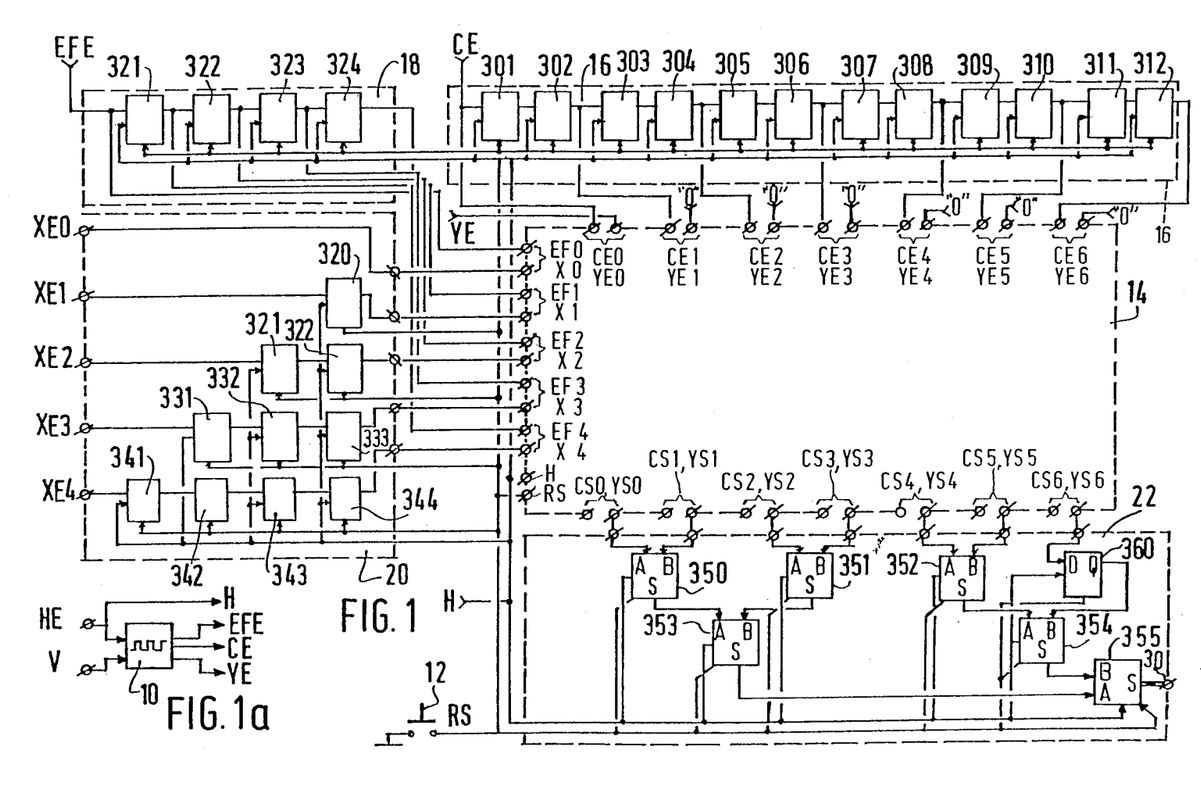
FIG. 1 shows a device for summing squares according to the invention.
FIG. 1a gives an elementary clock circuit therefor.
Figures 2, 3:
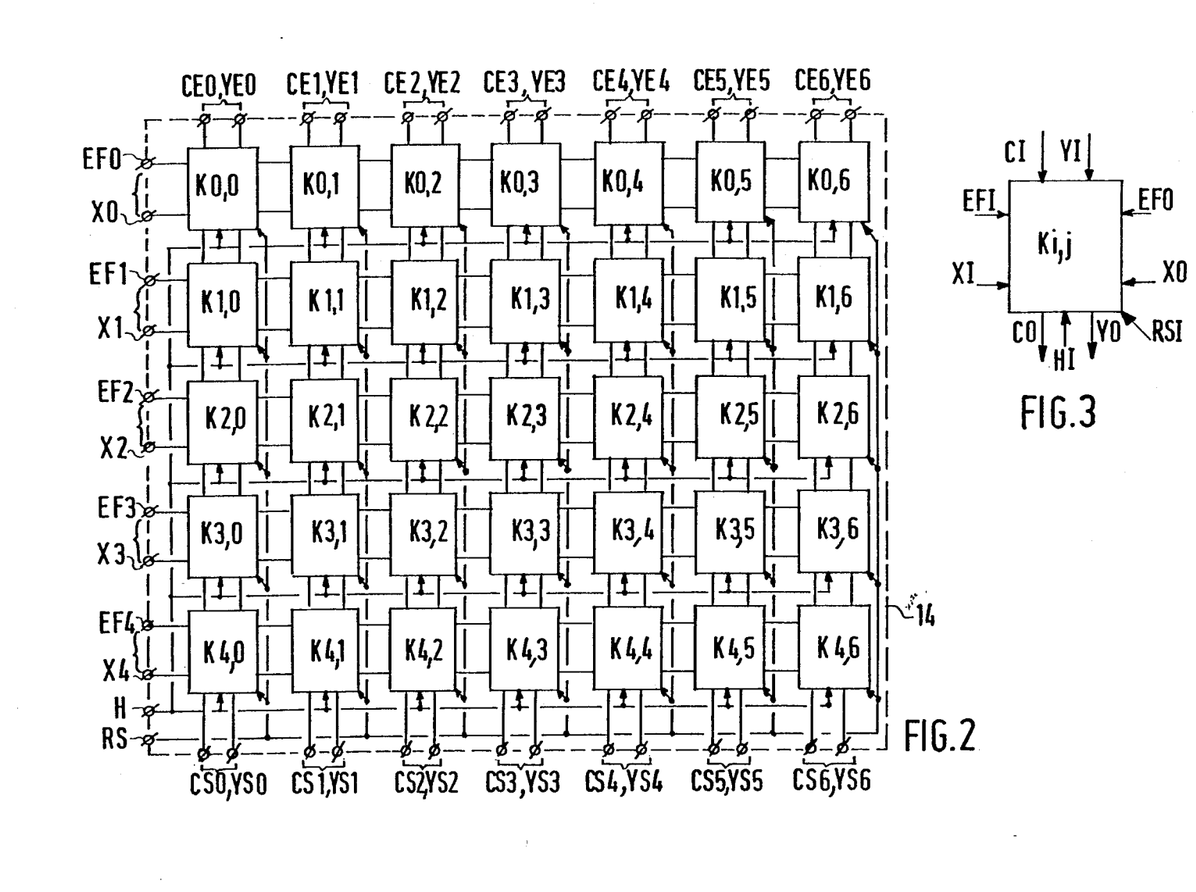
FIG. 2 shows the structure of the systolic network suitable for the device of FIG. 1.
FIG. 3 gives references for the inputs and outputs of the cells constituting the systolic network of FIG. 2.

FIG. 1 shows a device for summing squares according to the invention for n=5 and m=7. Each seven bit number is fed to its own input XE0, XE1, XE2, XE3, XE4, beginning with the least significant bit. It is assumed that this presentation takes place at the rate of signals H applied to one input HE of a clock circuit 10 and also that this presentation is validated by a signal V applied to this clock circuit 10. Like any logic circuit, the summing device is fitted with a reset input 12, shown in the form of a push-button, although the command may be given in any other way, e.g. a user circuit may directly actuate the zero reset. The square summing device comprises a systolic network 14, the details of which are shown in FIG. 2. With this systolic network are associated a first peripheral circuit 16 supplying various data to terminals YE0 CE0, YE1 CE1, YE2 CE2, YE3 CE3, YE4 CE4, YE5 CE5 and YE6 CE6 of the network and a second peripheral circuit 18 supplying various data to terminals EF0, EF1, EF2, EF3 and EF4. In addition, there is a number presentation circuit 20 acting as an interface between terminals XE0, XE1, XE2, XE3 and XE4 and terminals X0, X1, X2, X3 and X4 of network 14, and finally an output circuit 22.

BRIEF DESCRIPTION OF THE SYSTOLIC NETWORK

The systolic network shown in detail in FIG. 2 consists of thirty-six identical cells $K_{i,j}$; "i" is a whole number defining the row where the cell is located and varies from 0 to 4, while "j" is a whole number defining the column where the cell is located and varies from 0 to 6. FIG. 3 in some way shows the connection system of these cells. It illustrates the vertical inputs CI, YI, the vertical outputs CO, YO, the horizontal inputs EFI, XI, the horizontal outputs EFO, XO and finally the service signal input pins HI and RSI. The references of these pins are not shown in FIG. 2 in order not to clutter the diagram. Inputs CI, YI of cells K0,0; K0,1; . . . ; K0,6 are respectively connected to terminals CE0, YE0; CE1, YE1; . . . ; CE6, YE6. Inputs EFI, XI of cells K0,0; K1,0; . . . ; K4,0 are respectively connected to terminals EF0, X0; EF1, X1; . . . ; EF4, X4. In general, the vertical inputs are connected to the vertical outputs of the corresponding cell on the next-higher row, the horizontal inputs are connected to the horizontal outputs of the corresponding cell of the next column to the left. Although the outputs CS0, YS0; CS1, YS1; . . . ; CS6, YS6 are shown as connected respectively to pins CO, YO of cells K4,0; K4,1; . . . ; K4,6, output circuitry 22 is actually connected only to terminals YS0, YS1, . . . , YS6.

MEANS PROPOSED IN ACCORDANCE WITH THE INVENTION

In the invention, each row of cells is allocated to the calculation of the square of an associated number. The connections between output YO and (next-lower) input YI are use for signal transport from a particular row to the next lower row. The output circuit is an adding element supplying the result to terminal 30 from signals brought forward from the lowest row.

DESCRIPTION OF THE ALGORITHM USED

This invention is based on the following considerations: let there be a number B put in the following form:

$$B = b_{m-1} \cdot 2^{m-1} b_{m-2} \cdot 2^{m-2} + \ldots + b_1 \cdot 2 + b_0$$

where $b_j$ are binary elements (0 or 1), thus:

$$B^2 = (b_0 \cdot 2^0 + b_1 \cdot 2^1 + b_2 \cdot 2^2 + \ldots + b_{m-1} \cdot 2^{m-1})^2$$

By putting all the double products together according to $$(b_i \cdot b_j + b_j \cdot b_i) \cdot 2^{i+j} = b_i b_j 2^{i+j+1}$$

and as $b^2_i = b_i$ ($b_i = 0$ or 1), it is possible to write the product as the set of terms shown in FIG. 14.

The expression of FIG. 14 may be written taking account of any carry bits occurring to be propagated to their appropriate positions. This is shown in FIG. 15, where $bb_i$ are the binary elements of $B^2$. Each row of the systolic network will thus perform this operation for its assigned m-bit number.

For the two's complement calculation, reference may be made to the article entitled "Optimised Bit Level Systolic Array for Convolution" by J. V. McCanny et al., published in IEE Proceedings, Volume 131, Pt. F, No. 6, October 1984, pages 632 to 637.

The above operation, where $b_{m-2}$ is the binary element representing the sign "plus" by "0" and "minus" by "1" is then written according to FIG. 16.

Here, the line drawn above a product of binary elements means that the complement of this product is considered.

Each row of the systolic network will also perform this operation in two's complement. The various carry bits will be propagated so that the output circuit may provide their sum.

DETAILED DESCRIPTION OF THE CELLS OF THE SYSTOLIC NETWORK

Figure 4:
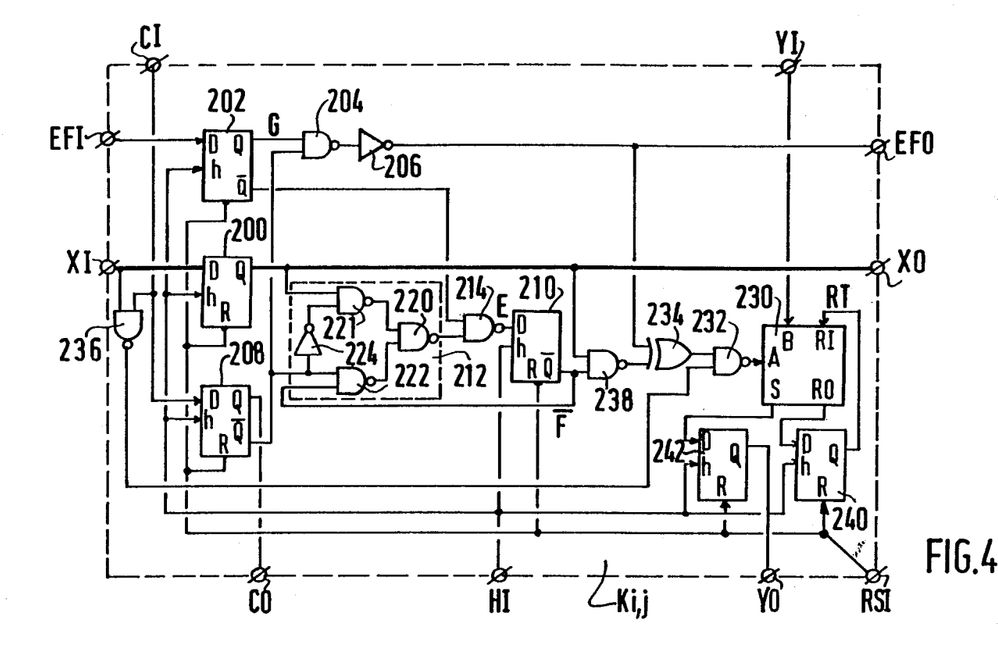
FIG. 4 shows a detailed construction of a cell of the systolic network.

Each cell Ki,j (see FIG. 4) of the systolic network comprises a first type D-flip-flop 200, the input D of which is connected to input XI and the output Q of which is connected to output XO. Its clock input h is connected to input HI to receive the signals from clock circuit 10 so that the binary elements are transmitted from input XI to output XO at the rate of these signals. A second type D-flip-flop with the reference 202 is fitted to delay control signal EFI over a time period T. Input D of this flip-flop 202 is connected to input EFI and output Q to output EFO via a NAND gate 204 and a logic signal inverter 206, the whole behaving like an "AND" gate. A third type D-flip-flop 208 is used to delay the control signal at input CI by the same time T. Input D of flip-flop 208 is connected to input CI, input h to clock input HI and output Q to output CO. The second input of NAND gate 204 is connected to outputs $\overline{Q}$ of flip-flop 208. A fourth type D-flip-flop 210 in combination with a logic circuit 212 is used to store the binary element provided at the output of flip-flop 200. Input D of flip-flop 210 is connected to the output of logic circuit 212 via a NAND gate 214; this gate 214 controls the transmission of the output signal of logic circuit 212 to input D of flip-flop 210 under control of the logic signal at output $\overline{Q}$ of flip-flop 202. Circuit 212 is in fact a switching circuit which selects either the signal at output $\overline{Q}$ of flip-flop 210 or the signal at output Q of flip-flop 200. This selection depends on the signal stored in flip-flop 208. This circuit 212 consists of three NAND gates 220, 221 and 222, each with two inputs. The output of gate 220 constitutes the output of circuit 212; the two inputs of this gate 220 are connected to the outputs of gates 221 and 222, one of the inputs of gate 221 receives the signal at the output of flip-flop 200, one of the inputs of gate 222 is back-connected to output $\overline{Q}$ of flip-flop 210. The signal at output $\overline{Q}$ of flip-flop 208 is applied as it is to the other input of gate 222 and via an invertor circuit 230 fitted with two operand inputs A and B, one output for the result S, one input to receive a carry bit RI and one output to supply a carry bit RO. Input A is fed by the output of a NAND gate 232 with two inputs, the first of which is connected to the output of an "EXCLUSIVE-OR" gate 234 and the second to the output of a NAND gate 236 with two inputs. The first input of gate 236 is connected to input XI and the other to input CI. The first of the two inputs of "EXCLUSIVE-OR" gate 234 is connected to the output of inverter 206, while the other is connected to the output of a NAND gate 238 with two inputs respectively connected to output Q of flip-flop 200 and output $\overline{Q}$ of flip-flop 210. Gates 232, 234, 236 and 238 allow the following logic signal SA to be applied to the input of adder 230:

$$SA = CI \cdot XI + (XO \cdot \overline{F} \oplus EFO)$$

where CI, XI, XO and EFO represents the signals at the inputs with these references, $\overline{F}$ the signal at output $\overline{Q}$ of flip-flop 210 and where the symbols ".", "+" and "⊕" represent the logic operations AND, OR and EXCLUSIVE-OR, respectively.

Input B of adder 230 is connected to terminal YI, input RI to output Q of a fifth flip-flop 240 of type D, input D of which is connected to output RO of this adder 230. This flip-flop 240 is intended to store the value of the carry bit generated by circuit 230 at output RO and to re-apply it to input RI. A sixth D-type flip-flop 242 records the result available at output S in order to supply it to output YO. The clock inputs of these flip-flops 240 and 242 are connected to terminal HI. It will be noted that all reset inputs R of flip-flops 200, 202, 208, 210, 240 and 242 are connected to input RSI.

OPERATION OF THE CELLS OF THE SYSTOLIC NETWORK

It should first of all be remembered that flip-flops 200, 202, 208 and 242 serve respectively for the delaying by the period of the clock signals applied to terminal HI:
of the binary elements "$b_i$" passing from XI to XO;
of the value of the signal passing from EFI to EFO;
of the value of the carry signal passing from CI to CO;
of the value of the signal passing from YI to YO, whereto in transit the value of the signal applied to input A of adder 230 is added.

Flip-flop 210 stores the binary elements for output XO in relation to the following conditions based on the value of G (output signal of flip-flop 202) and the value of signal CO, which may be written:
If $G=1$: $E=1$
If $G=0$ and $CO=1$: $E=\overline{XO}$
If $G=0$ and $CO=0$: $E=\overline{F}$
thus
if $F=0$ and $CO=0$, the signal at output XO retains the value which it had before the appearance of the "active" transition of clock signal HI;
if $G=0$ and $CO=1$, the signal at output XO is stored in flip-flop 210;
if $G=1$, flip-flip 210 is reset to zero. It will then be noted that, with $CO=1$, the binary element at output XO is stored in flip-flop 210 and with $G=1$ flip-flop 210 is re-initialized.

Adder 230 calculates the sum S. If before the arrival of a value "1" for signal CI, the flip-flop is at "0" and $EFO="0"$, then:

$$S = YI \oplus RT,$$

where RT is the value of the signal at the output of flip-flop 240.

At the moment t when $CI=1$, the following sequence of signal values applies:

| At t: CI = 1 | S = YI + RT + XI |
| At t + T: CI = 0, F = 0 | S = YI + RT |
| At t = 2T: CI = 0, F = $b_i$ | S = YI + RT + $b_i$ · XO | where T is the clock period of the processing. If the moment at which value EFO occurs is called t+KT, then $$S = YI \oplus RT + \overline{b_i \cdot XO},$$

thus $CI=0$, $F=0$, $S = YI \oplus RT$.

It will be noted that signal $EFO=1$ makes it possible on the one hand to make the complement of signal XO·F, i.e. $\overline{XO \cdot F}$, which is necessary when the numbers are coded in the two's complement system and, on the other, to reset flip-flop 210 for the next calculation.

The logic assembly formed by NAND gate 204 and inverter 206 makes it possible to block the logic signal arrived at EFI when $CI=1$ and $EFI=1$ simultaneously (but flip-flop 210 is reset to zero anyway). In fact, if $CI=EFI=1$, the cell receives the final binary element, i.e. the one indicating the sign. No partial product should therefore appear. At the next clock period, in the absence of this logic assembly, $EFO=1$ would occur, when a parasitic partial product $XO \cdot F = 1$. To avoid this partial product, the logic function $EFO = \overline{G \cdot CO}$ will be used, so that $EFO=0$ if $CO=1$.

DESCRIPTION OF THE PERIPHERAL CIRCUITS

The first peripheral circuit 16 shown in FIG. 1 is made up of a set of twelve type D-flip-flops 301, 302, . . . , 312 arranged as a shift register. The data input of flip-flop 301 receives a signal CE from clock circuit 10 in FIG. 1a. Signal CE is applied unchanged to input CEO of network 14, and the signals at the outputs of flip-flops 302, 304, 306, 308, 310 and 312 are applied to inputs CE1, CE2, CE3, CE4, CE5 and CE6. To input YEO is applied a signal YE from circuit 10, while inputs CE1, CE2, CE3, CE4, CE5 and CE6 continuously receive a signal of logic value "0". The signal CE is shifted at the rate of the signals H applied to the clock inputs of flip-flops 301 to 312. The resetting inputs of these flip-flops receive signal RS.

The second peripheral circuit 18 is made up of four D-flip-flops 321, 322, 323 and 324 arranged as a shift register. All these flip-flops receive a signal EFE from circuit 10 just as input EFO of network 14. The signals at the outputs of flip-flops 321, 322, 323 and 324 are respectively applied to the inputs of the systolic network EF1, EF2, EF3 and EF4. The clock signal inputs of these flip-flops receive signal H and the resetting inputs signal RS.

DESCRIPTION OF THE PRESENTATION CIRCUIT

Presentation circuit 20 in FIG. 1 consists of a direct link between terminals XE0 and X0, a D-type flip-flop 320, the data input of which is connected to terminal XE1 and output Q to terminal X1, a set of two D-flip-flops 321 and 322 arranged as a shift register interconnecting terminals XE2 and X2, a set of three D-flip-flops 331, 332 and 333 arranged as a shift register interconnecting terminals XE3 and X3 and a set of four flip-flops 341, 342, 343 and 344 interconnecting terminals XE4 and X4. The clock inputs of these flip-flops receive signal H and the resetting input signal RS.

DESCRIPTION OF THE OUTPUT CIRCUIT

Output circuit 22 consists of six elementary adder circuits 350, 351, 352, 353, 354 and 355 and a D-type flip-flop 360, the latter simply constituting an adder circuit with "0". These elementary adder circuits have each two operand inputs A and B which are connected for circuit 350 to outputs YS0 and YS1, for circuit 352 to outputs YS2 and YS3, for circuit 353 to the outputs S of circuits 350 and 351, for circuit 354 to the outputs S and Q of circuit 352 and flip-flop 360 and for circuit 355 to the outputs S of circuits 353 and 354. Output S of circuit 355 constitutes output terminal 30. Input D of flip-flop 360 is connected to terminal YS6. The elementary adder circuits are fitted with one input to receive clock signals H and a resetting input for signals RS, like flip-flop 360.

DESCRIPTION OF THE ELEMENTARY ADDER CIRCUIT

Figure 5:
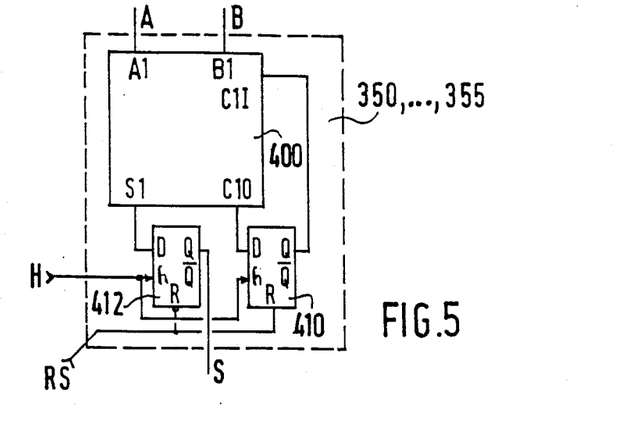
FIG. 5 shows the structure of the elementary adder circuits suitable for the output of the systolic network.

FIG. 5 shows in detail the constructions of an elementary adder circuit. It is made up from a one-bit full adder referenced 400. The latter has operand inputs A1 and B1 constituting inputs A and B of the elementary adder circuit. The one bit full adder is also fitted with a carry input C1I connected to the output of a D-type flip-flop 410, a carry output C1O connected to input D of flip-flop 410 and finally a result output S1 connected to input D of a D-type flip-flop 412. Output Q of this flip-flop forms the output S of elementary adder circuit 350, ..., 355. The clock inputs of these flip-flops 410 and 412 receive signal H and their reset inputs signal RS.

DESCRIPTION OF THE CLOCK CIRCUIT

Figure 6:
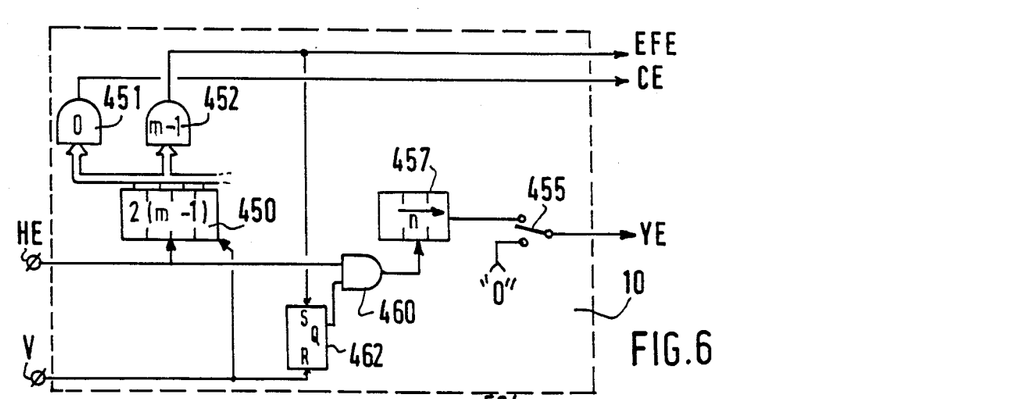
FIG. 6 shows the structure of a clock circuit needed for the operation of the square-summing device of FIG. 1.

FIG. 6 shows the construction of clock circuit 10 in detail. It is made up from a counter 450 counting up to twelve (or is more generally a modulo "$2(m-1)$" counter). It reacts on the active transitions of signal H applied to terminal HE if the validation signal applied to terminal V is of suitable value. Terminal V is connected to the resetting input of this counter 450. Thus, if the signal applied to V does not validate the number, the counter is kept at zero; if the signal does validate the number, the counter is freed and its content increases from "0". A first decoder 451 supplies signal CE, which assumes value "1" if the content of counter 450 is "0" and a second decoder 452 supplies signal EFE; this signal EFE assumes the value "1" when the content of the counter equals six (more generally "$m-1$"). In the natural binary notation, signal YE=0; for this purpose, a two-position selector 455 makes YE=0 when set to its first position. In two's complement notation, selector 455 is set to its second position. Here, signal YE is the output signal of a storage circuit consisting of a shift register 457 containing value "n". The shift control of this register, operating also at the rate of signal H, is permitted only when the content of the register is equal to six or ($m-1$). To this end, there is a two-input NAND gate 460, with the first input connected to terminal HE and the second to output Q of an RS flip-flop 462, while the output of this gate is connected to the shift control of register 457. Input R of flip-flop 462 is connected to terminal V and input S to the output of decoder 452.

In order to understand the usefulness of this signal YE it is necessary to consider the operation represented above for the calculation of a two-complement square; in this operation, a line of binary elements (the last) was seen in which was a single "1" corresponding to weighting $2^{m-1}$. If the sum of two squares is concerned, addition of these "ones" would give binary $(10) \times 2^{m-1}$; the sum of three squares would result in binary $(11) \times 2^{m-1}$, and so on. It will be seen that the bracketed quantity (10), (11), etc. represents the number n of squares to be added, which value "n" which will thus be injected into the systolic network as soon as the weighting $2^{m-1}$ is processed.

FORMATION OF THE SUM OF SQUARES

FIGS. 7a, 7b, 7c, 7d, 7e, 7f and 7g explain the formation of a sum of squares. For the sake of simplicity, the systolic network shown consists only of two rows each comprising four cells, only the first three of which are shown. It is then intended to calculate $B^2+C^2$ where $$B = b_3 \cdot 2^3 + b_2 \cdot 2^2 + b_1 \cdot 2 + b_0, \text{ and}$$

$$C = c_3 \cdot 2^3 + c_2 \cdot 2^2 + c_1 \cdot 2 + c_0.$$

Figure 7A:
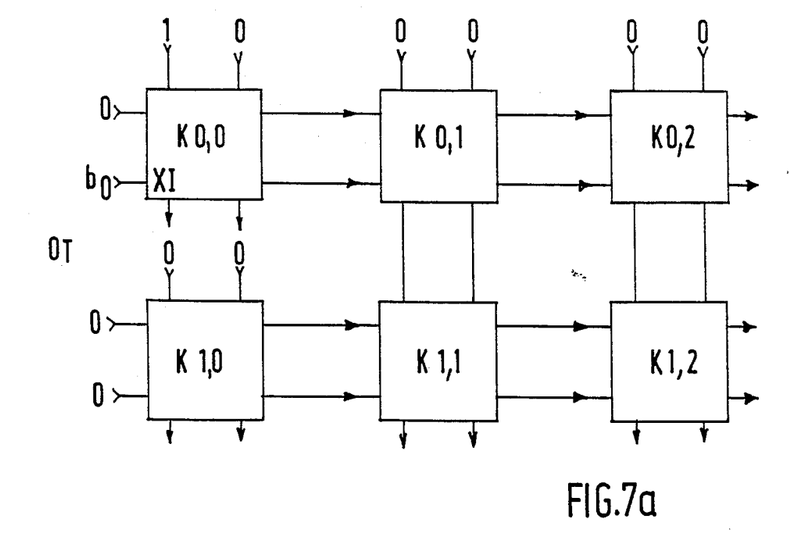
FIGS. 7a, 7b, 7c, 7d, 7e, 7f, 7g and 7h represent the generation and transfer of different signals within the systolic network.

FIG. 7a represents the systolic network at time 0T, i.e. when binary element $b_0$ is presented at input XI of cell K0,0. As the content of counter 450 (FIG. 6) is zero at this time, the signal at the output of decoder 452 is "1": CE=1.

Figure 7B:
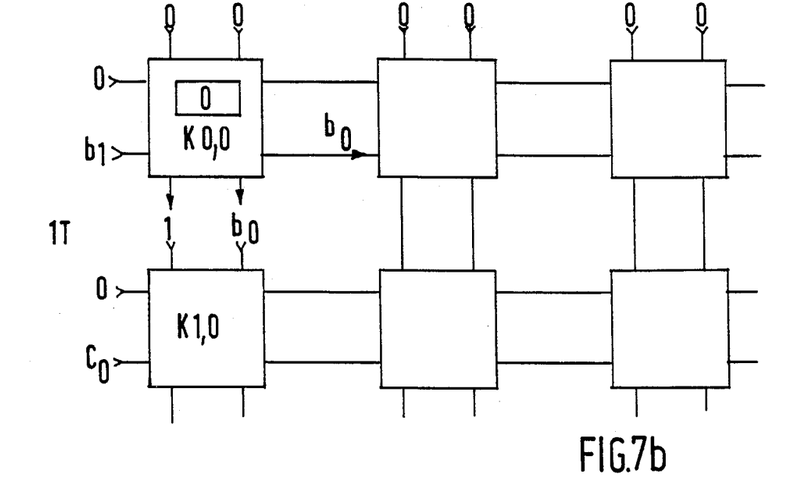

FIG. 7b shows the systolic network at time 1T, when binary element $b_1$ is applied to input XI of cell K0,0 whilst element $c_0$ is applied to input XI of cell K1,0. Output CO of cell K0,0 is at "1", which "1" had been stored at time 0T in flip-flop 208 of this cell K0,0. The rectangle surrounding the value 0 in cell K0,0 shows that signal F (output signal of flip-flop 210) is "0". The signal at output YO of cell K0,0 is $b_0$; this value is the result of the addition recorded in flip-flop 242 (FIG. 4) representing the binary element $b_0$ at input A of adder 230 of cell K0,0, with the value "0" at input B of the same adder. At this time 1T the signal at output XO of K0,0 represents binary element $b_0$. As the signal at output CO is "1", $b_0$ is found at input D of flip-flop 210; at time 2T (FIG. 7c) $b_0$ is stored in flip-flop 210 of cell K0,0.

Figure 7C:
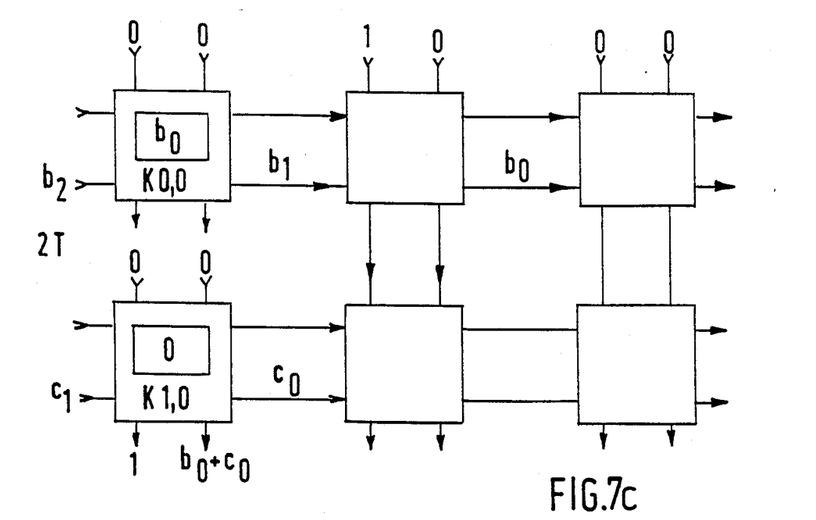

In FIG. 7c at output YO of cell K1,0 appears the result $b_0 + c_0$, i.e. the least significant bit of the sum $B^2+C^2$; this first bit passing through adders 350, 353 and 355 will be transmitted to terminal 30 only after an interval 3T, i.e. at moment 5T.

Figure 7D:
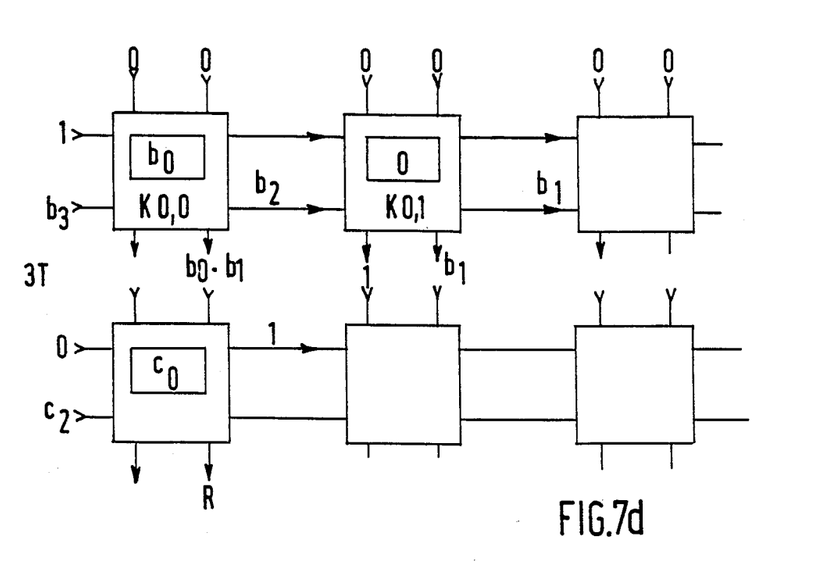
Figure 7E:
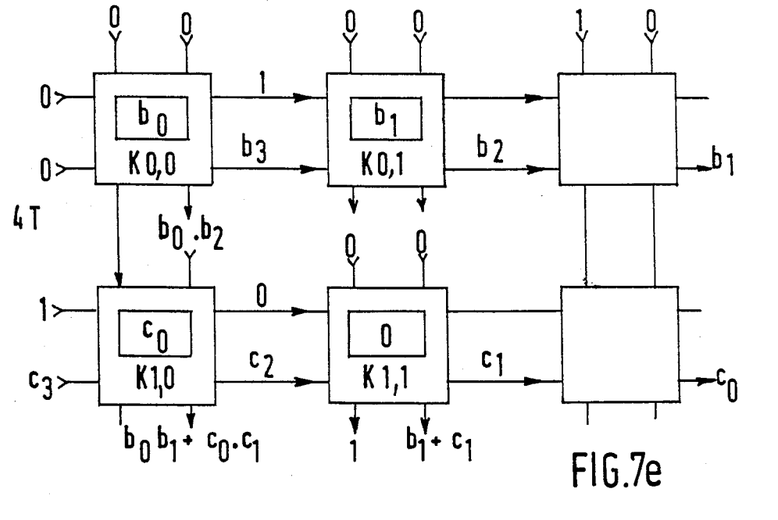
Figure 7F:
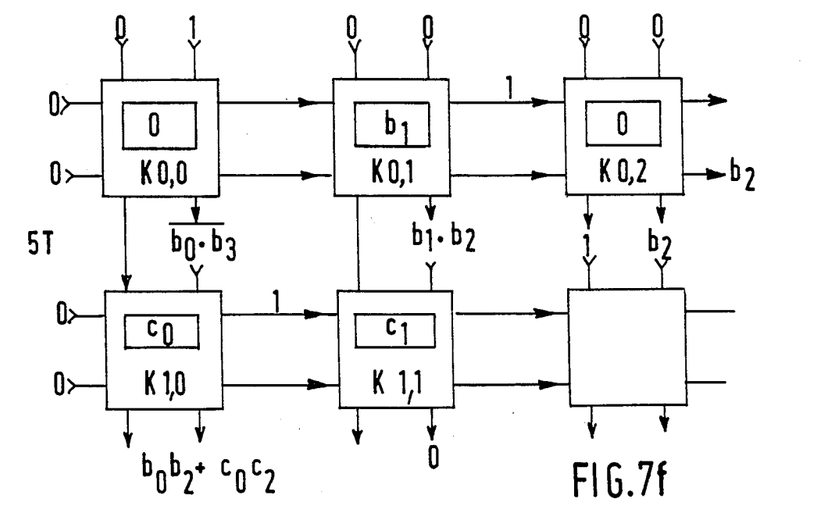
Figure 7G:
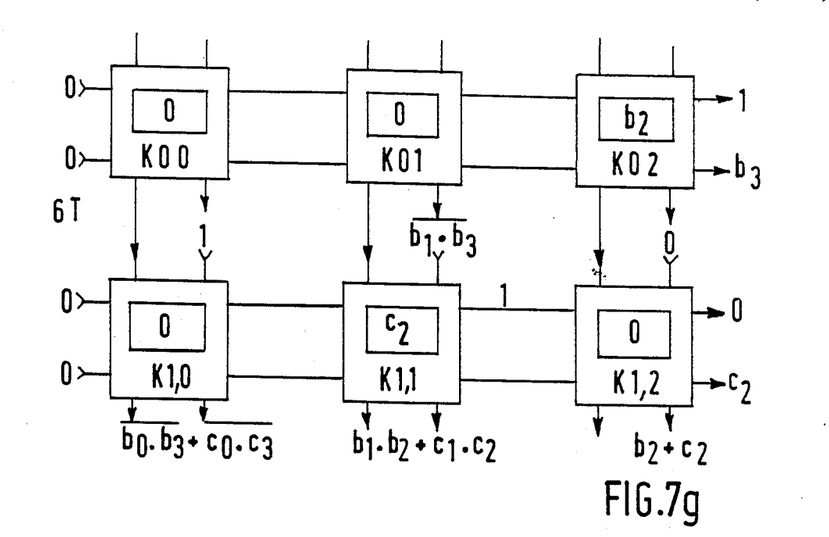
Figure 7H:
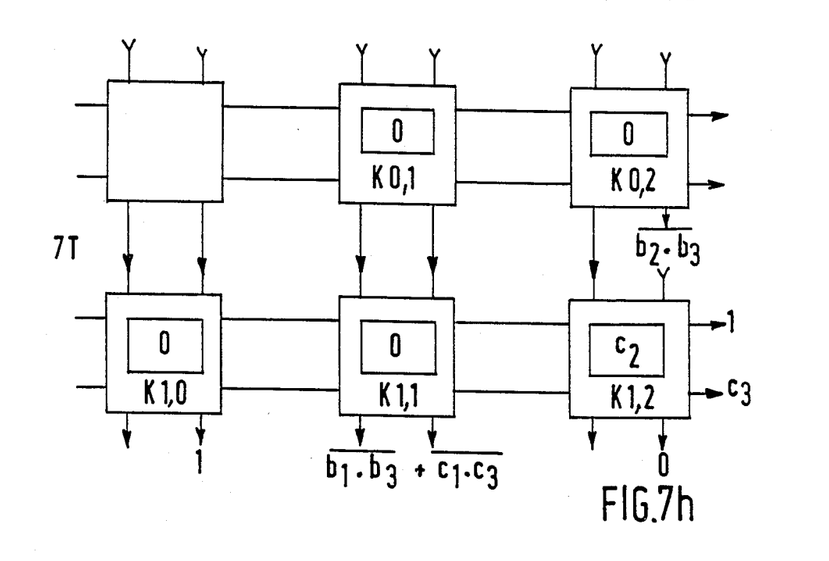

FIG. 7d shows the state of the signals at this moment 3T. Here, it is assumed that there were four bits at time 3T. Decoder 453 (FIG. 6) supplies a signal "1" which is applied to input EFI of cell K0,0; this signal will make it possible to give the complement of the product $b_0 \cdot b_3$ (i.e. $\overline{b_0 \cdot b_3}$) where numbers B and C are represented as two's complement. This product will be provided at time 4T (FIG. 7e) and supplied to output YO of cell K0,0 at time 5T (FIG. 7f). The signal "1" applied to inputs EFI is transmitted horizontally along the row passing through flip-flops 202 of the respective cells and vertically through the flip-flops of the associated second peripheral circuit 18. Thus, at output YO of cell K0,1 there is the product $b_1 \cdot b_3$ at time 6T (FIG. 7g) and the product $\overline{b_2 \cdot b_3}$ at output YO of cell K0,2 at time 7T. (FIG. 7h). This signal of value "1" which is applied to inputs EFI of the cells is also designed to reset them It is thus found that, at time 4T (FIG. 7e) a signal of logic value "1" is at output EFO, making E=1; signal $\overline{F}$ at output $\overline{Q}$ of flip-flop 210 is therefore "0", shown in the square in cell K0,0 of FIG. 7f and then in succession in cells K0,1 (FIG. 7g) and K0,2 (FIG. 7h). For the lower line, this occurs in cell K1,0 at time 6T (FIG. 7g) and in cell K1,1 at time 7T (FIG. 7h). Thus the systolic network is ready to receive new numbers in order to produce the sum of their squares.

The sum of the squares is now formed as follows. At time 2T the result $b_0+c_0$ is provided at output of cell K1,0; at the following time 3T, as the signal at input YI is "0", the signal at ouptut YO of this cell K1,0 is the value of the carry of $b_0+c_0$ (which will give the first two binary elements of the sum of the squares).

At time 4T, at output YO of cells K1,0 and K1,1 there are respectively $b_0 \cdot b_1 + c_0 \cdot c_1$ and $b_1+c_1$, which will then give the third binary element of the sum. In these sums, the carry is stored at all levels and the additions are successively made by binary element, the carry always being added to the next more significant bit of the sum.

At time 5T FIG. 7f the respective results $b_0 \cdot b_2 + c_0 \cdot c_2$ and 0 will be seen to appear at output YO of cells K1,0 and K1,1 respectively a result taking account of the carry brought forward from the previous addition.

At time 6T are seen the results at output YO of cells K1,0, K1,1 and K1,2 respectively:

K1,0 K1,1 and K1,2:$\overline{b_0 \cdot b_3} + \overline{c_0 \cdot c_3}$, $b_1 \cdot b_2 + c_1 \cdot c_2$, $b_2 + c_2$ In the two-complement notation, "n" should be added to the bits of weight $2^3$ (or $2^{m-1}$ in case of the more general two's complement operation referred to above). The "1" appears only at time 5T (FIG. 7f) since here n=10 in the binary system.

Figure 8:
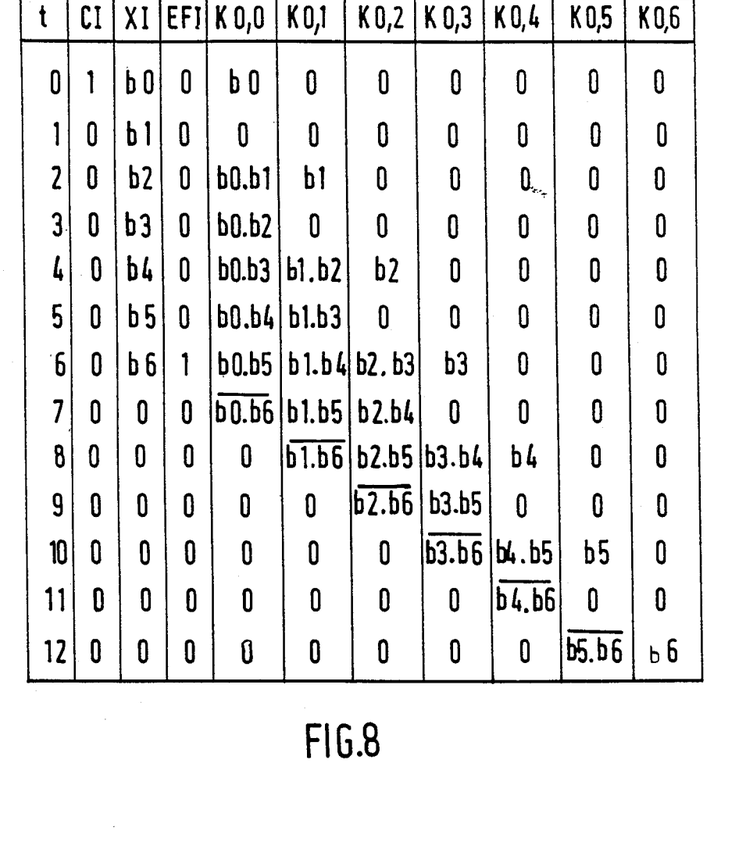
FIG. 8 shows the time variant activity of the various cells in the first row of the network.

It is interesting to note the calculations made by the cells as a function of the time "t". FIG. 8 shows the calculations successively made by the first line of cells K0,0, ..., K0,7. It will be seen that the succession of calculations takes place from t=0 for cell K0,0 to time t=12 for cells K0,5 and K0,6 (the time in FIG. 8 is counted in multiples of T).

EXAMPLE OF AN ALTERNATIVE EMBODIMENT

Figure 9:
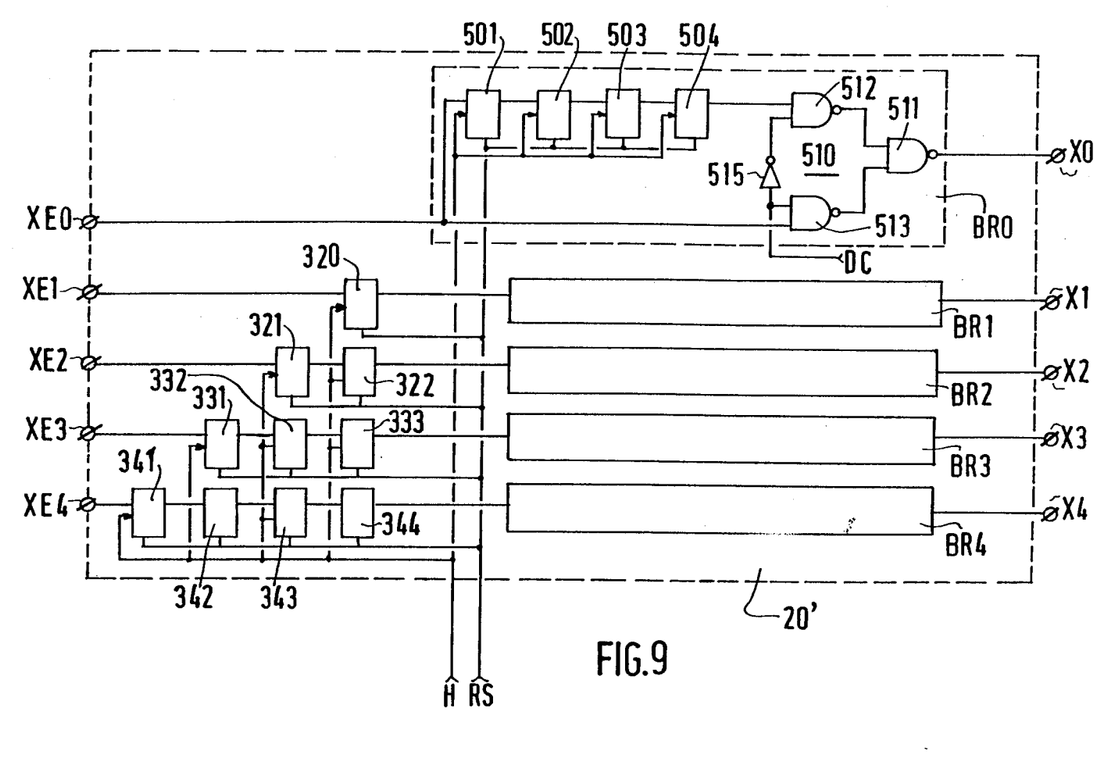
FIG. 9 shows a detail of another embodiment of a data presentation circuit for a systolic network with a smaller number of columns.

FIG. 9 shows another embodiment of the structure of a presentation circuit 20' suitable for a variant of a square-summing device of the invention. This circuit includes the same components as those of circuit 20 shown in detail in FIG. 1. FIG. 9 shows that five shift branches BR0, BR1, BR2, BR3 and BR4 have been added which are inserted between terminals XE0 and X0, between the output of flip-flop 320 and terminal X1, between the output of flip-flop 322 and terminal X2, between the output of flip-flop 333 and terminal X3 and finally between the output of flip-flop 344 and terminal X4, respectively. As these five branches BR0 to BR4 have the same structure, only branch BR0 is shown in detail in FIG. 9. It consists of four D flip-flops arranged as a shift register 501, 502, 503 and 504 and a multiplexer 510 consisting of a set of three NAND gates with two inputs 511, 512 and 513 and a logic signal inverter 515. The output of gate 511 constitutes the output of branch BR0. The two inputs of this gate 511 are connected to the outputs of gates 512 and 513. The first inputs of gates 512 and 513 constitute the inputs of multiplexer 510 and are connected in one case directly to the input of branch BR0, here the one corresponding to terminal XE0, and in the other to the output of the shift register made up of the four flip-flops 501, 502, 503 and 504, input D of the first being connected to the input of the branch. The control is performed via a signal DC applied directly to the second input of gate 513 and applied to the second input of gate 512 via inverter 515.

Figure 10:
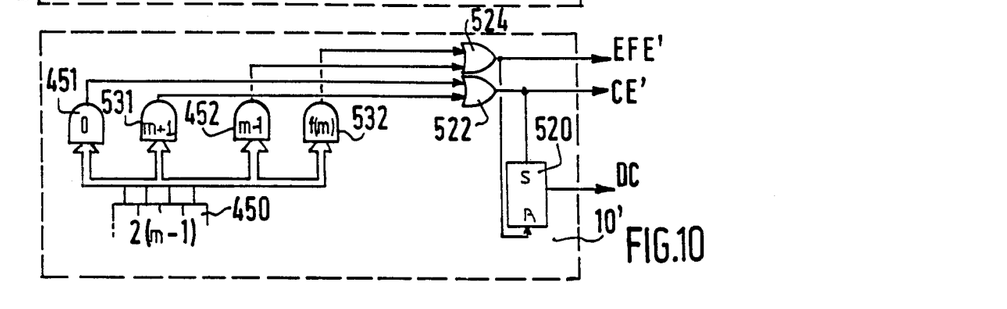
FIG. 10 shows the alterations made to the circuit of FIG. 6 to make it compatible with the circuit of FIG. 9.

This signal DC is produced by clock circuit 10' shown in detail in FIG. 10. This circuit differs from the one shown in FIG. 6 in that signals EFE and CE are transformed into signals EFE' and CE' and in that, to supply signal DC, there is an RS-type flip-flop 520, input S of which is connected to the output of OR gate 522 to receive signal CE', while its resetting input receives signal CE' supplied by an OR gate 524. Signal DC appears at output Q of this flip-flop 520. The two inputs of OR gate 522 are connected in one case to the output of decoder 451 and in the other to the output of decoder 531. One of the inputs of OR gate 524 is connected to the output of decoder 452 and the other to the output of decoder 532. Decoder 531 supplies an active signal for a content of counter 450 equal to 8 (m+1 in general) while decoder 532 supplies this active signal for a content equal to 10 (more generally, if this content be referred to as CMP:

$CMP = m + (m-1)/2$ with b odd $CMP = m + m/2$ with b even)

Figure 11:
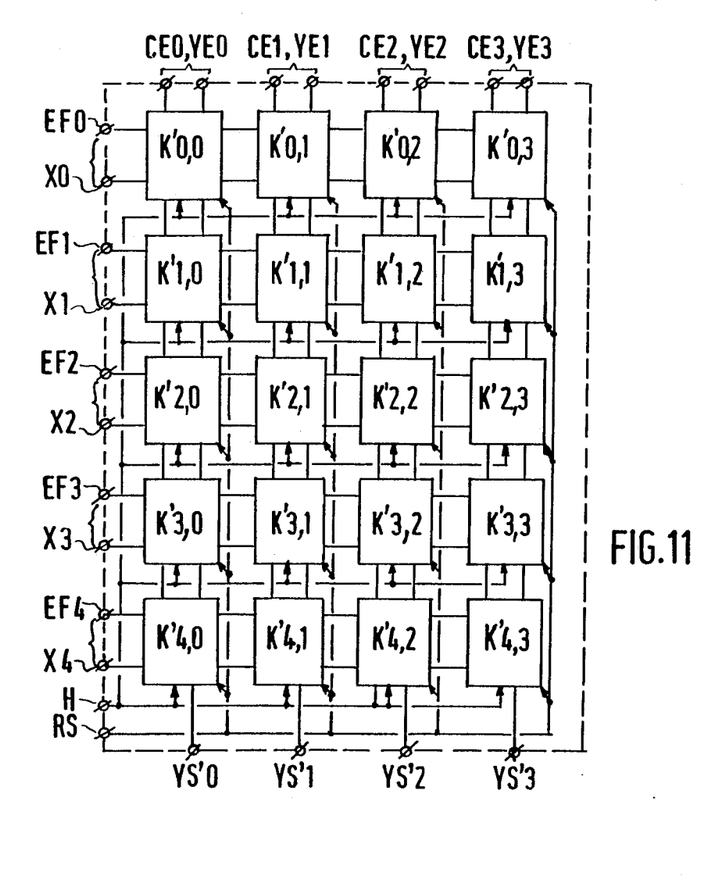
FIG. 11 shows a systolic network with a smaller number of columns.

With this presentation circuit 20' shown in FIG. 10, the systolic network of FIG. 11 now has only four columns of cells instead of seven to perform the same operations:

K'0,0; K'1,0; ...; K'4,0

K'0,1; K'1,1; ...; K'4,1

K'0,2; K'1,2; ...; K'4,2

K'0,3; K'1,3; ...; K'4,3.

This reduction in the number of columns is equal for each row by a number NCM:

$NMC = m/2$ with m even $NMC = (m-1)/2$ with m odd

Figure 12:
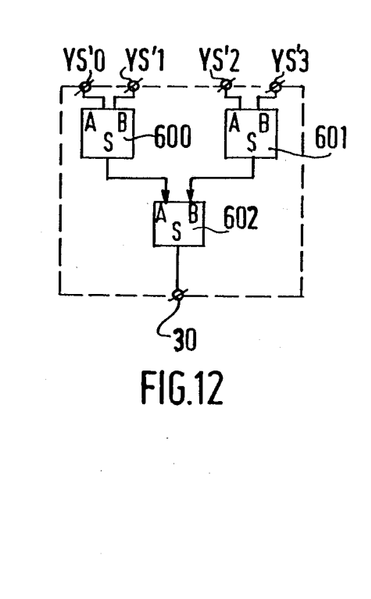
FIG. 12 shows the details of the construction of an output circuit for the network in FIG. 11.
Figure 13:
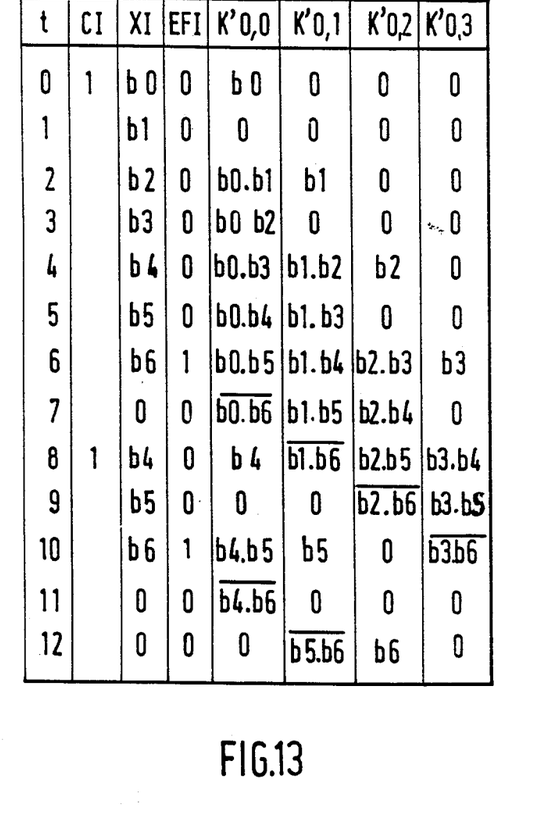
FIG. 13 shows the time variant activity of the various cells in the first row of the network of FIG. 11.

For a four-column systolic network, the output circuit shown in detail in FIG. 12 now has only three elementary adder circuits 600, 601 and 602. Inputs A and B of adder 600 are connected to outputs YS'0 and YS'1 of the network of FIG. 11 and inputs A and B of 601 to outputs YS'2 and YS'3. Inputs A and B of adder 602 are connected to outputs S of adders 600 and 601. Output S of adder 602 constitutes terminal 30 of the square-summing device. In order to understand this reduction in the number of columns, reference is made to FIG. 8 where the operation of the first row of the seven-cell-per-line systolic network is shown diagrammatically. It will be noted that at times t=6 and t=8 only four cells provide a result taking part in the sum of the squares. Circuit 20' thus makes it possible to use four cells per row to obtain the same result. Reference is made to FIG. 13, which shows that from time t=0 to time t=6 the binary elements b0 to b6 are applied to input XI of cell K'0,0 and then at time t7 a "0" is applied to this input. At time t8 signal DC (FIG. 8) changes its value so that the binary element b4 passes from the output of flip-flop 504 to input XI of cell K'0,0. At this time t8 signal CE' assumes the value "1" corresponding to a content "8" of counter 450 decoded by decoder 531, then the binary elements b4, b5 and b6 are once more presented to input XI of cell K'0,0 at times t=8 to t=10. At time t=11 signal DC assumes the value "1" which means that "0" is found at input XI; at time t=12 the calculation of the upper line is completed.

It is interesting to compare FIGS. 12 and 13. Thus, the value b4 provided by cell K0,4 is processed by cell K'0,0 at time t=8; values $b_4 \cdot b_5$ and b5 supplied by cells K0,4 and K0,5 are processed by cells K'0,0 and K'0,1 respectively at time t−10. The value $\overline{b_4 \cdot b_6}$ supplied by cell K0,4 is drawn up by cells K'0,0 at time t=11 and finally the values $\overline{b_5 \cdot b_6}$ and b6 supplied by cells K0,5 and K0,6 are processed by cells K'0,1 and K'0,2 respectively.

What is claimed is:

1. A device for calculating the sum of the squares of up to "n" numbers each number having up to "m" binary elements, wherein "n" and "m" are greater than or equal to "2", comprising:
   a systolic network of identical cells arranged in rows and columns including an upper row, a lower row and an input column, each row adapted for calculating the square of one of said numbers;
   input presentation means connected to said network for supplying signals representing the "n" numbers to said network;
   a first peripheral circuit means for supplying signals to the upper row;
   second peripheral circuit means for supplying signals to the input column;
   output circuit means connected to the lower row;
   means for linking contiguous rows of said cells to carry forward the calculation results of an upper row to the next lower row and wherein the output circuit comprises an adding component supplying a result from sums brought forward from the last row.

2. A device for summing squares as claimed in claim 1, further comprising clock means having a frequency 1/T connected to each network and in which each cell comprises first delay means to delay a data bit by an interval T multiplying means connected to said delay means and adding means connected to said multiplying means for adding a result of the multiplying means to a carry input YI for generating a carry signal at an output YO.

3. A device for summing squares as claimed in claim 2, wherein each cell comprises second delay means for delaying a control signal received at an input CI by an interval T for thereafter being supplied to an output CO.

4. A device for summing squares as claimed in claim 2 intented for two's complement numbers, in which each cell also comprises third delay means connected to an input EFI to delay a second binary control signal by an interval T before presentation to an output EFO.

5. A device for summing squares as claimed in claim 1, in which the first peripheral circuit comprises delay means for delaying a binary control signal formed on the appearance of a first binary data signal by 2T and supplying this delayed control signal to an input CI of the cells of the upper row.

6. A device for summing squares as claimed in claim 1 intended for two's complement numbers, in which the second peripheral circuit means comprises delay means for delaying a second binary control element formed on the appearance of an mth binary data element by T.

7. A device for summing squares as claimed in any of claims 1 to 6, in which the presentation means comprising "n" delay means having a delay of 0, T, . . . , (n−1)T respectively, one of said "n" delay means connected to each cell of said input column and whilst the systolic network comprises "m" columns.

8. A device for summing squares as claimed in claim 6 in which the presentation means comprises "n" delay means each allocated to a data element input of the cells of the input column, these "n" delay means producing delays of 0, T, . . . (n−1)T respectively, and "n" branch means connected to the outputs of these "n" delay means to apply, in a first stage, the "m" binary data elements directly to the input column and, in a second stage, to apply the last k binary elements after a time T following the appearance of the last binary data element (k=(m−1)/2 with m odd and k=(m/2)−1 with m even), and wherein the systolic network comprises (m-k) columns.

9. A device for summing squares as claimed in claim 8, intended for two's complement numbers, further comprising hold circuit means for supplying in series the number "n" to input YI of the first cell of the input column.

* * * * *